(12) United States Patent
Ligeret et al.

(10) Patent No.: US 9,729,705 B2
(45) Date of Patent: Aug. 8, 2017

(54) AUDIBLE ALERTS FOR CO-LOCATED DEVICES

(71) Applicant: T-Mobile USA, Inc., Bellevue, WA (US)

(72) Inventors: Xavier Ligeret, Seattle, WA (US); Teck-Kong Chong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/981,832

(22) Filed: Dec. 28, 2015

(65) Prior Publication Data

US 2017/0187870 A1    Jun. 29, 2017

(51) Int. Cl.
*H04M 3/42* (2006.01)
*H04W 4/02* (2009.01)

(52) U.S. Cl.
CPC ... *H04M 3/42017* (2013.01); *H04M 3/42348* (2013.01); *H04W 4/02* (2013.01)

(58) Field of Classification Search
CPC ......... H04M 3/42017; H04M 3/42348; H04M 1/72547; H04M 2207/18; H04M 1/72525; H04M 1/7253; H04L 12/587; H04L 29/08657; H04L 12/5895; H04L 29/08108; G06Q 30/02; H04W 4/02; H04W 4/12; H04W 8/245; H04W 8/265
USPC ............ 455/404.2, 412.1–414.2, 418–422.1, 455/456.1–457, 552.1
See application file for complete search history.

(56) References Cited

U.S. PATENT DOCUMENTS

| | | | | |
|---|---|---|---|---|
| 6,937,716 B2* | 8/2005 | Lai | ....................... | H04M 19/041 379/372 |
| 7,142,841 B1* | 11/2006 | Almassy | ............. | H04M 1/6505 379/88.18 |
| 7,162,237 B1* | 1/2007 | Silver | ..................... | H04W 4/02 455/417 |
| 7,606,561 B2* | 10/2009 | Mathew | ................ | H04M 1/665 379/204.01 |
| 8,532,627 B1* | 9/2013 | Nassimi | ............ | H04M 3/42153 340/7.28 |
| 9,037,122 B2* | 5/2015 | Frey | ........................ | H04W 4/16 455/417 |

(Continued)

OTHER PUBLICATIONS

Polk, et al., "Location Conveyance for the Session Initiation Protocol", Internet Engineering Task Force (IETF), Standards Track, Dec. 2011, retrieved from <<https://tools.ietf.org/pdf/rfc6442.pdf on Nov. 17, 2015>>, 35 pages.

*Primary Examiner* — Babar Sarwar
(74) *Attorney, Agent, or Firm* — Lee & Hayes, PLLC

(57) ABSTRACT

A user may have multiple devices that are associate with a single user address such as an email address, a telephone number, a user name, a user ID, etc. When a communication is addressed to the single user address, each of the devices is queried to determine its location, and any devices that are co-located within a common geographic area are identified. For those devices within the common geographic area, one of the devices is selected and instructed to play an audible alert. The other devices within the common geographic area are not instructed or are specifically instructed not to play the audible alert. All of the user's multiple devices may present a visual alert.

20 Claims, 4 Drawing Sheets

(56) References Cited

U.S. PATENT DOCUMENTS

| | | | |
|---|---|---|---|
| 2005/0096030 A1* | 5/2005 | Boyd | G08B 21/24 455/419 |
| 2008/0318561 A1* | 12/2008 | Olshansky | H04M 3/42374 455/417 |
| 2009/0110155 A1* | 4/2009 | Graves | G08B 21/0453 379/51 |
| 2013/0102298 A1* | 4/2013 | Goodman | H04W 4/16 455/417 |
| 2015/0084770 A1* | 3/2015 | Xiao | H04L 67/26 340/540 |
| 2016/0057572 A1* | 2/2016 | Bojorquez Alfaro | H04W 4/021 455/411 |
| 2016/0057579 A1* | 2/2016 | Granito | G01C 21/00 455/456.3 |

* cited by examiner

AUDIBLE ALERTS FOR CO-LOCATED DEVICES

BACKGROUND

The use of mobile devices such as cellular telephones and other devices with cellular data connectivity is proliferating. Almost everyone has some sort of mobile, data-enabled device, and many people have multiple such devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications to provide greatly improved user experiences.

In many cases, a single user may have multiple devices configured to receive a particular type of communication. For example, the user may have a telephone number that is associated with several devices. When receiving a telephone call, each of the devices may ring, and the user may pick up the telephone call on any of the devices. Similarly, a user may have a messaging application installed on multiple devices and may receive messages on all the devices. When receiving a message, each of the devices may generate an audible alert as part of notifying the user of the message receipt.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
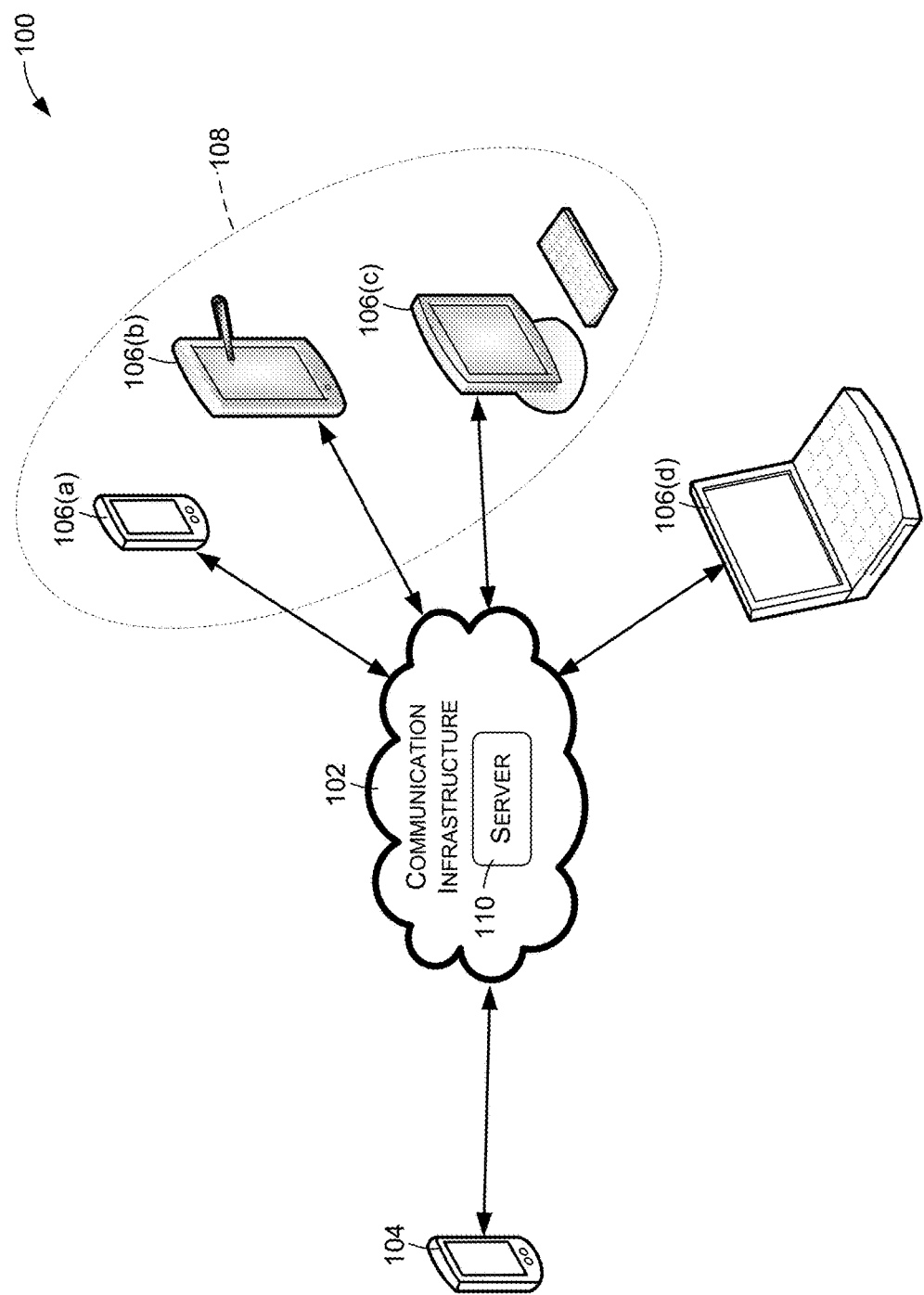
FIG. 1 is a block diagram illustrating an example communications infrastructure that provides communications with and between multiple devices.

The described implementations provide devices, systems, and methods for selectively generating ringtones or other audible alerts at different user devices. In described embodiments, a user may have multiple devices that are configured to receive communications using a single user address. A user address may comprise a user name, an email address, a telephone number, or any other information used to specify a user as the recipient of a communication. Communications may include voice communications, video communications, textual communications, and so forth.

As one example, a person may have a smartphone, a tablet computer, a wearable device, and a personal computer, all of which are configured to receive and accept voice calls placed to a single telephone number. As another example, each of the person's devices may have an application for receiving text messages addressed to the person's telephone number, and the person may receive and read a text message on any of the devices. As yet another example, each of the person's devices may have an application for receiving emails addressed to the person's email address, and the person may receive and read an email on any of the devices.

Typically, some sort of communication infrastructure is used for transferring communications between an originating device and a receiving device. For example, voice calls may be communicated through a cellular telecommunications network. Other types of communications such as emails, text messages, etc. may be placed through a wired or wireless network infrastructure that includes the Internet. Voice calls may also be placed through the Internet using voice-over-IP (VOIP) technologies. The communication infrastructure typically includes one or more servers that receive communications from originating devices, that provide the communications to receiving devices, and/or that administer various aspects of the communications. In some cases, a server may store received communications, and may allow client devices to access the communications from the server.

In the context of telephony calls, such as voice calls, a call is placed from an originating device to a particular telephone number. A telephony infrastructure receives a call setup notification that specifies the destination telephone number. In response, a server of the infrastructure identifies multiple devices that are associated with the telephone number and sends a location request to each of the devices. Upon receiving a location request, each device determines its current location and reports current location information to the infrastructure server. The infrastructure server analyzes the location information to determine whether any of the multiple user devices are co-located in the same general geographic area. For any group of co-located devices, the infrastructure server determines one of the devices that will ring to signal the user that a voice call is being received. The determination may be made, for example, based on configuration information provided by the user, such as an order of device priority.

After determining which device or devices are to provide an audible notification for the voice call, the infrastructure server sends a call setup message to each of the devices. The call setup messages indicate, for each device, whether the device is to generate a ring tone or other audible notification. Upon receiving a call setup message, each destination device may present a visual or graphical alert indicating an incoming voice call, while only specified devices generate an accompanying audible alert.

Although the example above relates to voice calls, the techniques described herein may be used for other types of messaging such as video messaging, recorded voice messaging, text messaging, instant messaging, email, and so forth. Furthermore, the techniques may be used in conjunction with notifications regarding events other than person-to-person communications, such as various types of notifications provided by applications that a user has installed on his or her devices. Such notifications, for example, may be generated by applications and associated Internet services for things such as breaking news, weather alerts, price reductions, reminders, calendar events and for many other purposes.

FIG. 1 illustrates a mobile communication system 100 in which the described techniques may be implemented. The system 100 comprises a communications infrastructure 102 that provides communications between an originating device 104 and multiple destination devices 106. Each of the originating and destination devices 104 and 106 may comprise a device having network communication capabilities such as a smartphone, a telephone handset, a headset, a wearable device, a computer, a personal computer, a desktop computer, a laptop computer, a tablet computer, etc. The communication capabilities of the devices 104 and 106 may include Wi-Fi capabilities, cellular or other telephony capabilities, and/or other wired or wireless network communication capabilities.

FIG. 1 shows a single originating device 104 and multiple destination devices 106. The originating device 104 is associated with an initiating user. All of the illustrated multiple destination devices 106 are associated with a single receiving user. Although only a single originating device 104 is illustrated, many different originating devices 104, associated with many different users, may access the communication infrastructure 102 in order to initiate communications with one or more devices of receiving users. Similarly, although only the destination devices 106 associated with a single user are shown in FIG. 1, large numbers of devices, associated with many users, may be used in the system 100. Furthermore, any given device may act as either an originating device or a destination device in a given or communication.

For purposes of discussion, three of the illustrated four destination devices, labeled by reference numerals 106(a), 106(b), and 106(c) are assumed to be co-located within a common geographic area 108. For example, the co-located devices may be in the same house or in the same room of a house. A fourth of the destination devices, labeled by reference numeral 106(d), is assumed to be in a different geographic location.

In the context of telephonic calls between users, the communications infrastructure 102 may comprise a telephonic communications network. In some cases, for example, the communications infrastructure may comprise a wireless, cellular communications network implemented in accordance with the System Architecture Evolution (SAE) communication standard and provided by a cellular communication services provider. In certain implementations, the system 100 may be implemented at least in part as a long-term evolution (LTE) cellular network. More generally, the system 100 may be implemented using any of various wireless networking technologies, including GSM (global system for mobile), GPRS (general packet radio service), EDGE (enhanced data rates for GSM evolution), UMTS (universal mobile telecommunications system), CDMA (code-division multiple access), various types of packet-switched networks, IEEE 802.11 networks (generally referred to as Wi-Fi), and so forth.

Note that different ones of the devices 106 may use different wireless networking technologies for accessing the telephonic communications network. For example, a first device 106 may use Wi-Fi connectivity while a second device 106 may use a cellular connection. Furthermore, a third device may connect to the communications network through a wired Ethernet connection.

In the LTE and other cellular environments, the communications infrastructure 102 may comprise a number of geographically dispersed base stations (not shown), comprising radio transceivers and antennas for communicating with corresponding transceivers of the devices 104 and 106. In many cases, the cellular network may provide connectivity with the Internet and various services and servers that are accessible through the Internet.

In certain embodiments, the communications infrastructure 102 may comprise a wide-area network, which may include or be based upon the Internet. The wide-area network may include or may be associated with wireless access points (not shown) that allow the devices 104 and 106 to connect and communicate wirelessly with the communications infrastructure 102. For example, the devices 104 and 106 may use Wi-Fi technologies, based on one or more variants of the IEEE 802.11 standard, to communicate through the communications infrastructure 102. Through the Internet, the devices 104 and 106 may communicate with a host of servers and services, in addition to communicating with other user devices. Services available through the Internet may include websites, data sources, commerce sites, telephony services, messaging services, and so forth.

The communications infrastructure 102 may include one or more servers 110 that support communications between originating devices and destination devices. The communications may include voice communications, video communications, textual communications, and so forth.

In a cellular network, the one or more servers 110 may comprise or may be provided by a cellular core network. For example, a server 110 may comprise a telephony application server (TAS) of the core network. In other environments, the one or more servers 110 may comprise one or more servers of a messaging service such as an email service or a text messaging service. Note that as used herein, the term "text messaging" or "text message" is not limited to short message service (SMS) messaging such as typically provided within cellular networks, but may include other types of text messaging services and group messaging services that convey messages using the Internet or other forms of data communications.

More generally, the server 110 may comprise one or multiple servers used to implement any type of network-accessible service that provides notifications to be given at user devices. In some embodiments, a server 110 may itself generate a message to be provided to the destination devices 106, rather than receiving a message generated by an originating device 104. For example, a server of an information service may provide notifications regarding news events, weather, appointments, and so forth.

In the context of a telephone call, the server 110 may receive or may obtain a voice call notification from the originating device 104. The call notification designates a telephone number that has been associated with the multiple destination communication devices 106. In response to the call notification, the server 110 communicates with the destination devices 106 to request their current geographic locations. Each destination device 106 responds by determining and providing its current location. Locations may be reported as geographical coordinates obtained by GPS (Global Positioning System) functionality of the devices 106. Alternatively, the devices 106 may provide location information from which a geographic location can be inferred, such as an IP address, the cell ID of the cell of a cellular communication network from which the device is currently receiving service, an identification such as an IP address of a Wi-Fi access point from which the device is currently receiving service, a location area code (LAC) of the cellular communication network, etc. In the case of IP addresses, it may be assumed that two devices on a common home Wi-Fi or Ethernet network will share the same public IP address, which may be used as an indication that the two devices are co-located. Furthermore, the public IP address may be cross-referenced with public databases to determine a general geographic area of the home network through which the devices are communicating.

The different communication devices may send different types of location information depending on circumstances and the types of information available to the devices. If the device is able to determine GPS coordinates, for example, the GPS coordinates may be reported. If a device is unable to determine GPS coordinates, IP addresses or other information such as the location area code, a routing area code, or a tracking area code of a cellular communication network may be provided.

Based on the received location information, the server 110 determines whether any of the destination devices 106 are co-located within a common area. Upon finding that a group of two or more destination devices 106 are co-located, the server designates one of the destination devices that should provide an audible alert such as a ring or ring tone. The server 110 then sends a call message to the designated device, signaling the designated device to produce an audible alert in conjunction with the incoming call. The server 110 also sends a call message to the other co-located devices, but does not signal the other co-located devices to produce an audible alert. Note that all of the devices may display a graphical, visual alert in conjunction with the incoming call.

With regard to designated devices 106 that are not co-located, a call message is sent to each of these devices, signaling them to produce the audible alert for the incoming call. Note that the audible alert, although referred to in the singular, may comprise a different tune, tone, or sound on each of the destination devices, as configured on each device by the user. The call message indicates merely whether to play the audible alert and does not necessarily specify the actual tune, tone, or sound. Furthermore, instructing a destination device to play its audible alert may be performed explicitly or implicitly. For example, the call message may include a field or flag indicating that a destination device is to produce the audible alert and the absence of the flag may indicate that the device is not to produce the audible alert. Similarly, a flag may indicate that the receiving device is not to produce an audible alert and the absence of the flag may indicate that the device is to produce the audible alert.

As between two or more co-located destination devices, the server 110 may determine which of the devices is to produce the audible alert by referencing configuration information provided by the user of the devices. The configuration information, for example, may indicate relative priorities of the user's destination devices, and the server 110 may specify the co-located device having the highest priority.

Figure 2:
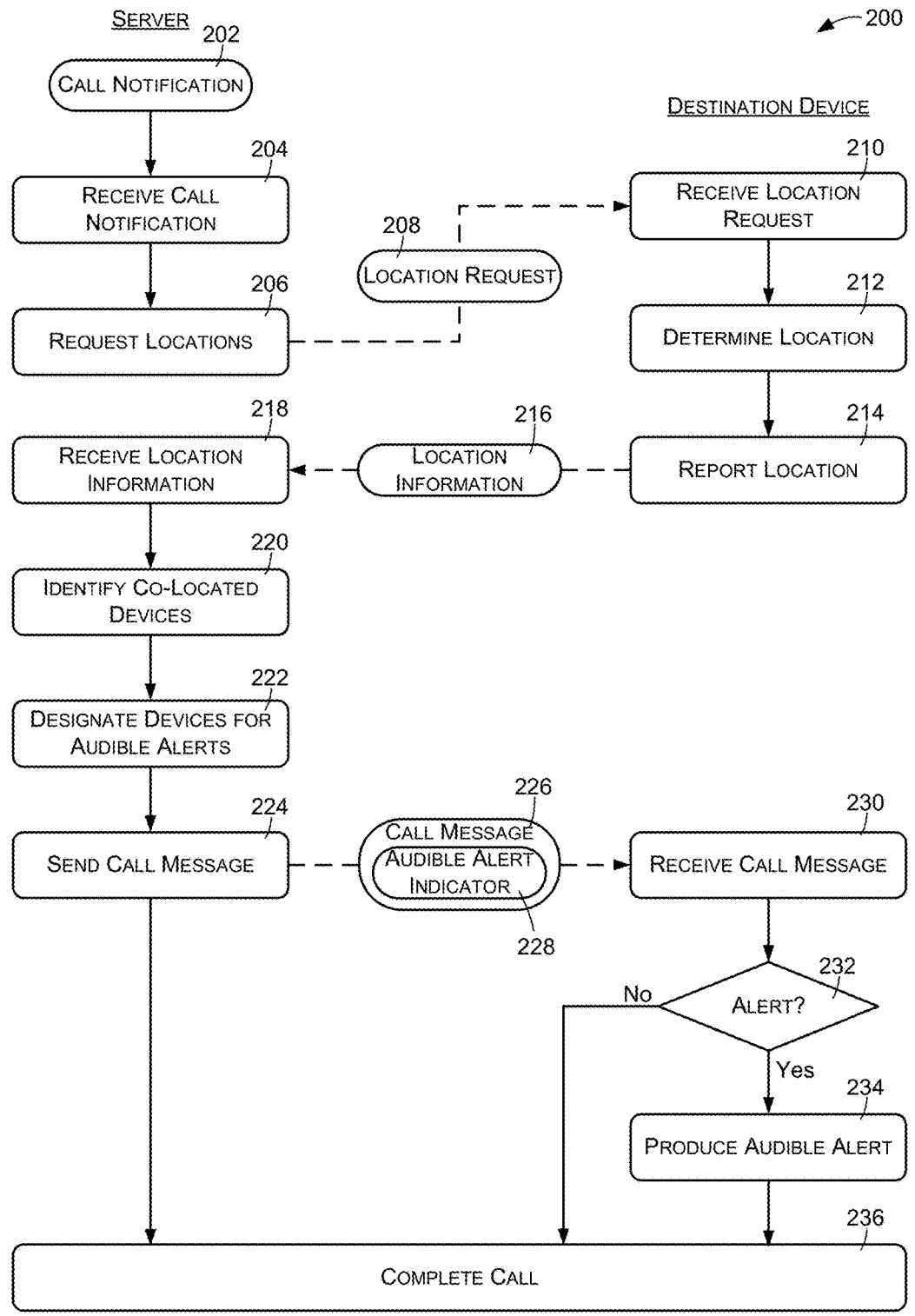
FIG. 2 is a flow diagram illustrating an example method of providing notifications to multiple devices of a user.

FIG. 2 illustrates an example method 200 of signaling a voice call to multiple communication devices that are associated with a common telephone number associated with a user of the communication devices. Actions on the left side of FIG. 2 are performed by the server 110 of a communications infrastructure. Actions on the right side of FIG. 2 are performed by each of multiple destination communication devices 106 that are associated with a common telephone number.

The example method 200 assumes the reception of a call notification 202 from an originating device 104. The call notification, for example, may in an SIP (session initiation protocol) environment comprise a SIP INVITE message. The call notification specifies the common telephone number of the user, which has been associated with the destination communication devices 106.

An action 204 comprises receiving the call notification 202. An action 206, performed in response to receiving the call notification 202, comprises requesting the location of each of the multiple communication devices 106 associated with the telephone number. The action 206 may comprise sending a location request 208 to each of the multiple communication devices 106. In an SIP environment, location request 208 may comprise an SIP OPTIONS message specifying an argument that is defined as indicating a location request. In certain embodiments, the location request 208 may be formatted and/or implemented in accordance with a standard described by RFC 6442, entitled "Location Conveyance for SIP", produced by the IEFT (Internet Engineering Task Force).

An action 210, performed by each of the destination devices 106, comprises receiving the location request 208. An action 212, performed by each destination device 106 in response to receiving the location request 208, comprises determining the location of the destination device. An action 214 comprises reporting location information 216, which may comprise sending a response to the SIP OPTIONS message in SIP environments.

The destination device 106 may determine the location information 216, as an example, by using GPS (global positioning system) functionality of the destination device 106, and the location information 216 may in this case comprise geographic coordinates. Alternatively, the location information 216 may comprise the cell ID of the communication cell from which the destination device 106 is currently receiving service, a location area code of a cellular communication system, an IP (Internet protocol) address of the destination device 106, an IP address or other identification of a wireless access point from which the destination device 106 is receiving service, or some other type of information from which an absolute or relative location can be derived.

An action 218, performed by the server 110, comprises receiving the location information 216 from each of the destination devices 106. An action 220, performed in response to receiving the location information, comprises identifying co-located devices, such as by determining which of the destination devices 106 are located in a common geographic area. The action 220 may comprise comparing geographic coordinates of the destination devices 106, for example, and identifying any destination devices that are within a threshold distance of each other. The action 220 may alternatively comprise comparing cell IDs and identifying any destination devices that report the same cell ID. As another alternative, the action 220 may comprise identifying any destination devices 106 that report the same wireless access point ID or IP address.

An action 222 comprises specifying devices that are to provide audible alerts to notify the user of the incoming call. The action 222 may comprise, for each identified group of co-located devices, designating one of the devices that is to provide an audible alert. The designation may be based on configuration information indicating relative priorities of the destination devices 106. Each destination device 106 that is not co-located with any other destination device 106 is also designated to provide the audible alert.

An action 224 comprises sending a call message 226 to each of the destination devices 106. In an SIP environment, the call message 226 may comprise an SIP INVITE message. The call message 226 may include an audible alert indicator or flag 228, indicating whether or not the destination device 106 receiving the call message 226 is to produce its audible alert in response to the call message 226. For example, call messages sent to the destination devices 106 that have been specified to provide audible alerts may include an audible alert indicator specifying that the receiving destination device 106 is to produce its audible alert. Call messages sent to the destination devices 106 that have not been specified to provide audible alerts may include an audible alert indicator specifying that the receiving destination device 106 is not to produce its audible alert. In other embodiments, the presence or absence of the indicator 228 may indicate whether or not the receiving destination device 106 is to produce its audible alert.

An action 230, performed by each destination device, comprises receiving the call message. An action 232 comprises determining whether the call message 226 has an audible alert indicator indicating that the receiving destination device 106 is to produce an audible alert to announce the voice call. If so, the destination device 106 performs an action 234, comprising producing an audible alert. An action 236 is then performed, by both the server 110 and the destination device 106, of completing the call in accordance with conventional signaling techniques such as SIP signaling techniques. If the call message 226 does not have an audible alert indicator indicating that the receiving destination device 106 is to produce an audible alert, the action 236 is performed without performing the action 234 of producing the audible alert.

Figure 3:
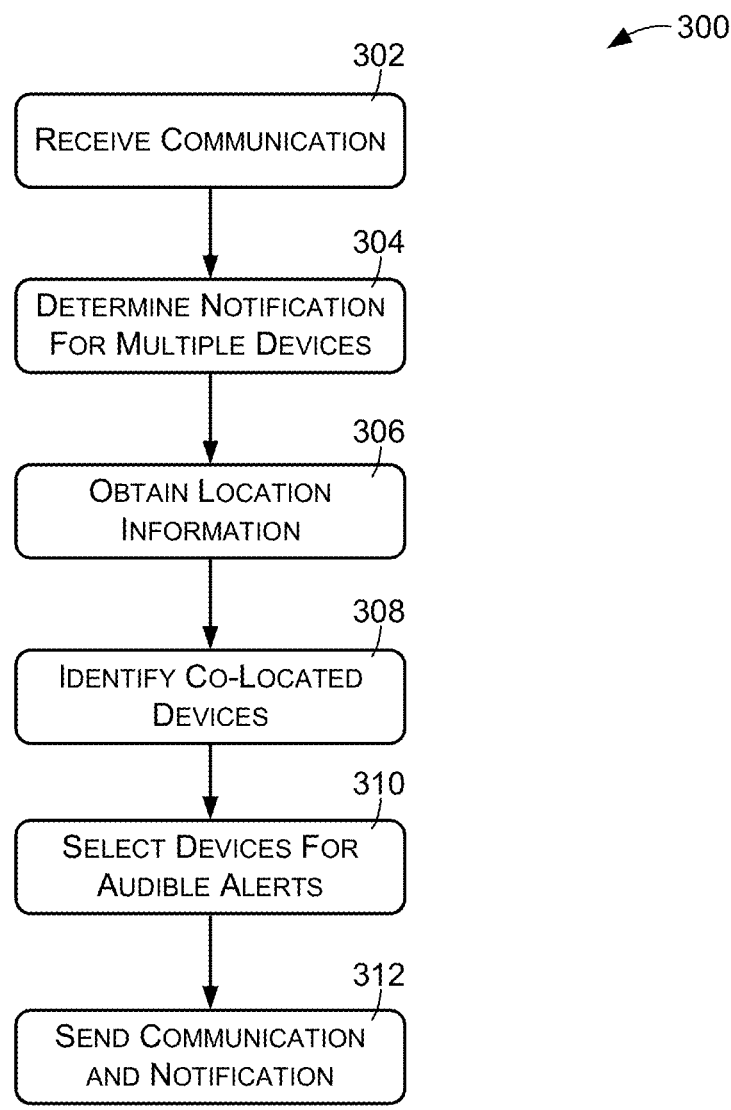
FIG. 3 is a flow diagram illustrating an example method of providing notifications to multiple devices that are associated with a common destination address.

FIG. 3 shows another example method 300 that may be performed by a server or other entity to provide notifications to multiple devices associated with a single user address. The user address may comprise, for example, a telephone number, an email address, a user name, a user ID (identifier), or any other information that is uniquely associated with a user. The notifications may be provided for various purposes, such as for person-to-person communications, for informing users of current or future events, prompting users for actions or input, for presenting information to users, and so forth. When presented by a device, a notification may include a visible component and/or an audible component. The visible component may comprise a graphical element such as a banner, an indicator notification such as an LED indicator, or any other form of visible signaling. The audible component, referred to herein as an audible alert, may comprise a tone, a tune, a ring, or another sound, including sounds produced by vibration of a device.

An action 302 comprises receiving a communication that specifies the user address. The communication may comprise an email, a message, a picture, a video, a sound, an audio segment, or any other form of information. The communication may be received from the device of another user or may be generated by a network-based service or other service. Service-generated communications may include such things as weather information, status information, news, calendar information, event information, sales offers, invitations, and so forth.

An action 304 comprises determining that a notification is to be presented at one or more of the user's devices to announce the communication to the user. The notification may comprise a visual component and/or an audible component.

An action 306 comprises obtaining location information from the multiple user devices. The action 306 may be performed generally as described above, such as by sending requests to the devices and receiving responsive location information. Alternatively, the action 306 may comprise referencing other devices or entities that have information regarding the locations of the user devices. For example, a cellular communication system may in some cases maintain updated information regarding device locations. Other types of systems may similarly maintain current information regarding device locations.

An action 308 comprises analyzing the location information corresponding to the respective user devices to identify one or more groups of one or more devices that are within a common geographic area. An action 310 comprises selecting one device within each identified group that is to produce an audible alert. The single device within each group may be selected randomly, selected based on device characteristics, and/or selected based on user-specified preferences or priorities.

An action 312 comprises sending the communication and notification to each of the destination devices, and causing each of the selected devices to generate an audible alert. In response to receiving the notification, each device may display a visual alert. The selected device in each group may also produce an audible alert.

Figure 4:
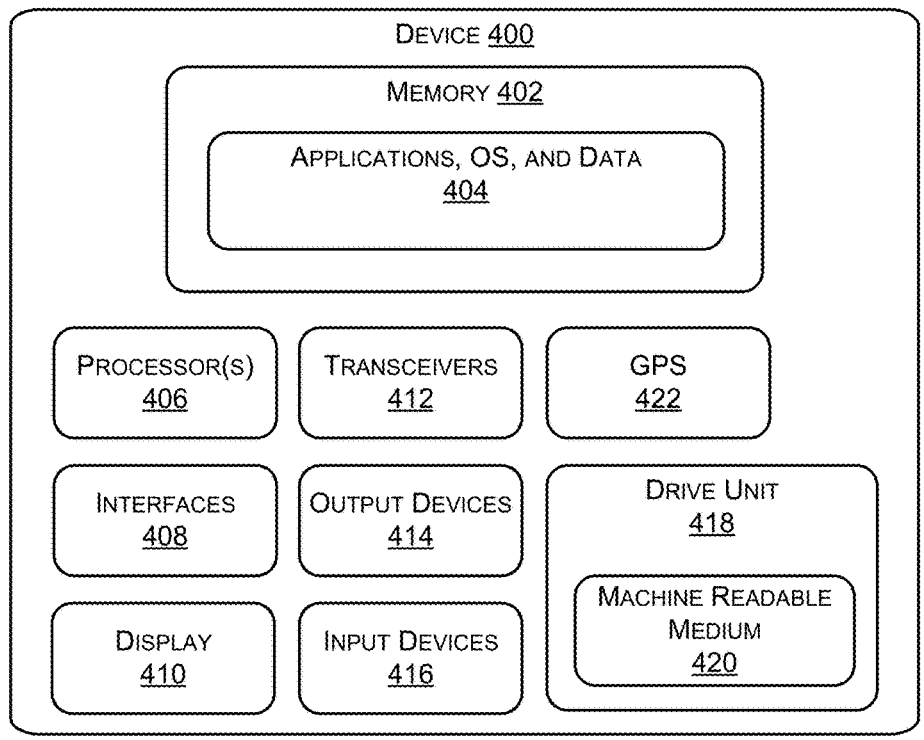
FIG. 4 is a block diagram of an example communication device that may be used in conjunction with the example methods described herein.

FIG. 4 illustrates an example device 400 in accordance with various embodiments. The device 400 is illustrative of example components of the devices 104 and 106.

As shown, the device 400 may include a memory 402, which may store applications, an operating system (OS), and data 404. The device 400 further includes processor(s) 406, interfaces 408, a display 410, radio transceivers 412, output devices 414, input devices 416, and a drive unit 418 including a machine readable medium 420.

In various embodiments, the memory 402 includes both volatile memory and non-volatile memory. The memory 402 can also be described as non-transitory computer storage media and may include removable and non-removable media implemented in any method or technology for storage of information, such as computer readable instructions, data structures, program modules, or other data. The applications, OS, and data 404 are stored in the memory 402. Additionally, in some embodiments, the memory 402 may include a SIM (subscriber identity module), which is a removable smart card used to identify a user of the device 400 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 400. Any such non-transitory computer-readable media may be part of the device 400.

In some embodiments, the processor(s) 406 is a central processing unit (CPU), a graphics processing unit (GPU), or both CPU and GPU, or other processing unit or component known in the art.

In various embodiments, the interfaces 408 are any sort of interfaces known in the art. The interfaces 408 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 410 may comprise a liquid crystal display or any other type of display commonly used in telecommunication devices or other portable devices. For example, display 410 may be a touch-sensitive display screen, which may also act as an input device or keypad, such as for providing a soft-key keyboard, navigation buttons, or the like.

In some embodiments, the transceivers 412 include any sort of transceivers known in the art. For example, the transceivers 412 may include radio radios and/or radio transceivers and interfaces that perform the function of transmitting and receiving radio frequency communications via an antenna, through a cellular communication network of a wireless data provider. The radio interfaces facilitate wireless connectivity between the device 400 and various cell towers, base stations and/or access points.

In some embodiments, the output devices 414 include any sort of output devices known in the art, such as a display (already described as display 410), speakers, a vibrating mechanism, or a tactile feedback mechanism. The output devices 414 also include ports for one or more peripheral devices, such as headphones, peripheral speakers, or a peripheral display.

In various embodiments, the input devices 416 include any sort of input devices known in the art. For example, the input devices 416 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 400 may also have a GPS (global positioning system) receiver 422 for determining the current location of the device 400 based on signals received from satellites.

The machine readable medium 420 stores one or more sets of instructions (e.g., software) such as a computer-executable program that embodies operating logic for implementing and/or performing any one or more of the methodologies or functions described herein. The instructions may also reside, completely or at least partially, within the memory 402 and within the processor 406 during execution thereof by the device 400. The memory 402 and the processor 406 also may constitute machine readable media 420.

Figure 5:
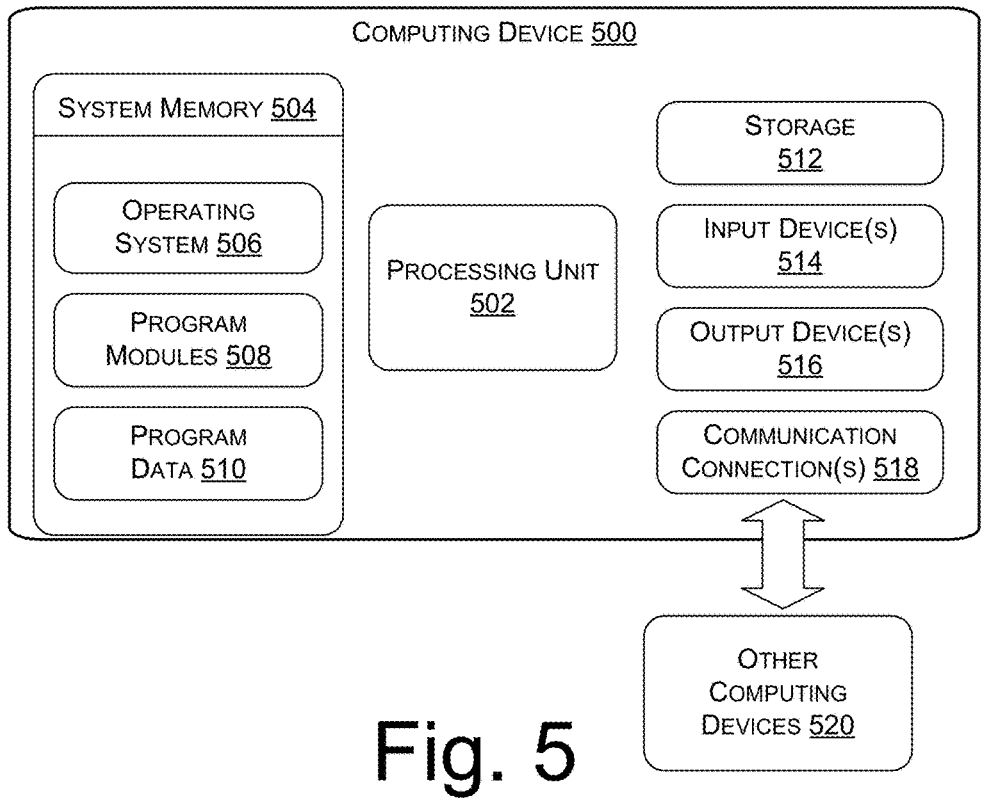
FIG. 5 is a block diagram of an example computing device that may be used to implement various components of a communications infrastructure, including servers of the communications infrastructure network.

FIG. 5 is a block diagram of an illustrative computing device 500 such as may be used to implement various components of the communication infrastructure 102 including routers, gateways, administrative components, etc., and including the server 110. In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by the server 110.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices 520.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving a call notification for an incoming call, the call notification designating a telephone number, the telephone number being associated with multiple communication devices;
   receiving first location information from a first of the multiple communication devices;
   receiving second location information from a second of the multiple communication devices;
   determining that the first communication device and the second communication device are in a common area based at least in part on the first and second location information;
   sending a first call message to the first communication device notifying the first communication device of the incoming call, wherein the first call message signals the first communication device to produce an audible alert; and
   sending a second call message to the second communication device notifying the second communication device of the incoming call, wherein the second call message does not signal the second communication device to produce the audible alert for the call.

2. The method of claim 1, wherein the communication devices comprise one or more of:
   a telephone handset;
   a smartphone;
   a personal computer;
   a tablet computer; or
   a wearable device.

3. The method of claim 1, wherein the incoming call is a voice call to a user of the communication devices with which the telephone number is associated.

4. The method of claim 1, further comprising:
receiving third location information from a third of the multiple communication devices;
determining that the third communication device is not in the common area based at least in part on the third location information; and
sending a third call message to the third communication device notifying the third communication device of the incoming call, wherein the third call message signals the third communication device to produce the audible alert.

5. The method of claim 1, further comprising:
receiving configuration information indicating a priority between the first and second communication devices; and
determining which of the first and second communication devices will produce the audible alert based at least in part on the configuration information.

6. The method of claim 1, further comprising:
sending a first SIP (session initiation protocol) OPTIONS message to the first communication device to request the first location information;
sending a second SIP (session initiation protocol) OPTIONS message to request to the second communication device to request the second location information;
wherein each of the first and second call messages comprises an SIP INVITE message.

7. The method of claim 1, wherein the first location information comprises geographical coordinates of the first communication device.

8. The method of claim 1, wherein the first location information comprises one or more of:
a cell ID corresponding to a cell of a cellular communication network;
one or more of a location area code, a routing area code, or a tracking area code of the cellular communication network; or
an IP address of the first communication device.

9. A method comprising:
determining that a notification of an incoming communication is to be presented at multiple devices of a user;
obtaining first location information of a first of the multiple devices;
obtaining second location information of a second of the multiple devices;
determining that the first device and the second device are in a common area based at least in part on the first and second location information;
sending a first message to the first device notifying the first device of the incoming communication and causing the first device to generate a first audible alert in conjunction with the notification; and
sending a second message to the second device notifying the second device of the incoming communication and causing the second device not to generate an audible alert in conjunction with the notification.

10. The method of claim 9, wherein determining that the notification is to be presented at the multiple devices comprises receiving a voice call notification for the multiple devices.

11. The method of claim 9, further comprising:
receiving third location information from a third of the multiple devices;
determining that the third device is not in the common area based at least in part on the third location information; and
sending a third message to the third device notifying the third device of the incoming communication and causing the third device to generate a second audible alert in conjunction with the notification.

12. The method of claim 9, further comprising causing the first and second devices to visually display the notification.

13. The method of claim 9, further comprising:
receiving configuration information indicating a priority between the first and second devices; and
determining which of the first and second devices will generate the first audible alert based at least in part on the configuration information.

14. The method of claim 9, wherein the first location information comprises geographical coordinates of the first device.

15. The method of claim 9, wherein the first location information comprises one or more of:
a cell ID corresponding to a cell of a cellular communication network;
one or more of a location area code, a routing area code, or a tracking area code of the cellular communication network; or
an IP address of the first device.

16. A system comprising:
one or more processors;
one or more non-transitory computer-readable media storing
computer-executable instructions that, when executed on the one or more processors, cause the one or more processors to perform actions comprising:
receiving a communication addressed to a user of multiple communication devices;
receiving first location information from a first of the multiple communication devices;
receiving second location information from a second of the multiple communication devices;
determining that the first communication device and the second communication device are in a common area based at least in part on the first and second location information;
sending a first notification of the communication to the first communication device and instructing the first communication device to generate an audible alert in conjunction with the first notification; and
sending a second notification of the communication to the second communication device and instructing the second communication device not to generate a first audible alert.

17. The system of claim 16, further comprising:
receiving third location information from a third of the multiple communication devices;
determining that the third communication device is not in the common area based at least in part on the third location information; and
sending a third notification of the communication to the third communication device, wherein the third notification instructs the third communication device to generate a second audible alert.

18. The system of claim 16, further comprising:
receiving configuration information indicating a priority between the first and second communication devices; and
determining which of the first and second communication devices will generate the first audible alert based at least in part on the configuration information.

19. The system of claim 16, wherein the first location information comprises geographical coordinates of the first communication device.

20. The system of claim 16, wherein the first location information comprises one or more of:
   a cell ID corresponding to a cell of a cellular communication network;
   one or more of a location area code, a routing area code, or a tracking area code first communication device.

* * * * *